United States Patent [19]

Kaiser et al.

[11] 3,859,331

[45] Jan. 7, 1975

[54] DOPA DERIVATIVES

[75] Inventors: Ado Kaiser, Neu-Frenkendorf; Wolfgang Koch, Riehen; Marcel Scheer, Basel; Uwe Wolcke, Bottimingen, all of Switzerland

[73] Assignee: Hoffman-La Roche, Inc., Nutley, N.J.

[22] Filed: Oct. 18, 1971

[21] Appl. No.: 190,269

[52] U.S. Cl............. 260/471 C, 260/404, 260/463, 260/465 D, 260/471 A, 260/501.11, 260/519, 424/300, 424/301, 424/304, 424/309, 424/312, 424/319
[51] Int. Cl.......................................... C07c 125/06
[58] Field of Search............ 260/471 A, 471 C, 519, 260/404

[56] References Cited

UNITED STATES PATENTS

| | | | |
|---|---|---|---|
| 3,488,363 | 1/1970 | Hinkley | 260/471 A |
| 3,553,258 | 1/1971 | Kaiser et al. | 260/471 A |
| 3,734,952 | 5/1973 | Krubiner | 260/471 A |

*Primary Examiner*—Lorraine A. Weinberger
*Assistant Examiner*—L. A. Thaxton
*Attorney, Agent, or Firm*—Samuel L. Welt; Jon S. Saxe; George M. Gould

[57] ABSTRACT

O', O' diethers or diesters of L-dopa and L-dopa esters which are useful as hypotensive, anti-pyretic and anti-parkinson agents.

17 Claims, No Drawings

DOPA DERIVATIVES

SUMMARY OF THE INVENTION

In accordance with this invention, it has been found that compounds of the formula

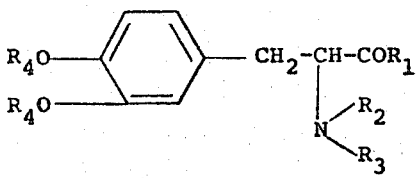   I wherein $R_1$ is hydroxy or a substituent containing from 1 to 18 carbon atoms selected from the group consisting of alkoxy, alkenylalkoxy, alkynylalkoxy or phenylalkoxy; $R_2$ is hydrogen or a substituent from 1 to 18 carbon atoms selected from the group consisting of phenyl, alkyl, alkenylalkyl, or alkynylalkyl; $R_3$ is hydrogen or a substituent containing from 1 to 18 carbon atoms selected from the group consisting of

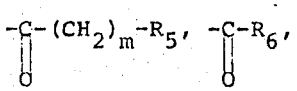

phenylthio and nitrophenylthio; $R_4$ is a substituent containing from 1 to 18 carbon atoms selected from the group consisting of

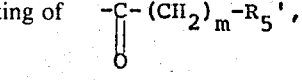

$—CH_2—(CH_2)_n—R_7$, alkylsulfonyl, alkoxymethyl; $R_5$ and $R_5'$ are hydrogen, alkoxy,

$R_6$ is alkoxy, phenylalkoxy,

alkenyl, alkynyl, amino, alkylamino, dialkylamino; $R_6'$ is alkoxy,

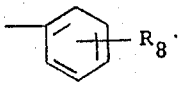

alkynyl, alkenyl, amino, alkylamino, dialkylamino; $R_7$ is alkenyl, alkynyl, alkoxyalkyl, cyano, carboxy, alkoxycarbonyl, alkenylalkoxycarbonyl, alkynylalkoxycarbonyl, phenylalkoxycarbonyl, aminocarbonyl, alkylaminocarbonyl, dialkylaminocarbonyl; $R_8$ and $R_8'$ are hydrogen, halogen, or alkoxy; $m$ is an integer of from 1 to 17 and $n$ is an integer of from 0 to 15, with the proviso that $R_3$ and $R_4$ are different substituents; or pharmaceutically acceptable salts thereof are useful as hypotensive, anti-pyretic and anti-parkinson agents.

The preferred phenylalanine derivatives of formula I provided by the present invention are those which are present in L or D, L-form.

The aforementioned aliphatic groups can be straight-chain or branched-chain. The alkyl groups preferably contains from 1 to 7 carbon atoms such as, for example, methyl, ethyl, isopropyl, n-hexyl, or n-heptyl. The term "alkoxy" preferably includes alkoxy derivatives containing from 1 to 7 carbon atoms such as methoxy, ethoxy, isopropoxy, n-heptyloxy, etc. The alkenylalkyl groups preferably contain from 3 to 7 carbon atoms such as, for example, allyl, 2-butenyl or 2,4-pentadienyl. The alkynylalkyl groups preferably contain from 3 to 7 carbon atoms such as, for example, 2-propynyl. The alkenylalkoxy and alkynylalkoxy groups preferably contain from 3 to 8 carbon atoms such as allyloxy, 2,4-pentadienyloxy, 2-propynyloxy, etc. A halogen atoms can be a fluorine, chlorine, bromine or iodine atom, with chlorine and bromine being preferred. The aforementioned alkanoyl groups contain at least 2, and preferably up to 8 carbon atoms such as, for example, acetyl, propionyl, butyryl, valeryl, hexanoyl, heptanoyl or isobutyryl. The alkenoyl groups preferably contain from 3 to 8 carbon atoms such as, for example, acrylyl, crotonyl or β-methylcrotonyl. The alkynoyl groups preferably contain from 3 to 8 carbon atoms such as, for example, propioloyl or methylpropioloyl. The alkoxycarbonyl, alkenylalkoxycarbonyl and alkynylalkoxycarbonyl groups preferably contain up to 8 carbon atoms such as, for example, methoxycarbonyl, ethoxycarbonyl, t-butoxycarbonyl, allyloxycarbonyl, 2,4-pentadienyloxycarbonyl or 2-propynyloxycarbonyl.

In accordance with this invention, the compounds of formula I, and their pharmaceutically acceptable salts, exhibit the aforementioned beneficial therapeutic properties. The compounds of formula I having both a free amino group and an acid group form a pharmaceutically acceptable salt with both inorganic and organic pharmaceutically acceptable acids as well as bases. The compound of formula I which contains amino groups, forms salts with pharmaceutically acceptable acids. Among the acids which the compounds of formula I form pharmaceutically acceptable acid addition salts are included hydrochloric acid, hydrobromic acid, sulfuric acid, phosphoric acid, citric acid, acetic acid, succinic acid, maleic acid, methanesulfonic acid, p-toluene-sulfonic acid and the like. Such acid addition salts are also within the scope of the invention.

The compounds of formula I which contain an acid group also form pharmaceutically acceptable basic salts. Among the preferred pharmaceutically acceptable basic salts of the compounds of formula I are included alkali metal salts, such as disodium or dipotassium salts, the alkaline earth metal salts such as calcium salts or the ammonium salts such as the diammonium salt.

The compounds of formula I which contain an amino and acid group are amphoteric in character. These compounds dissolve in acids or in alkalies in which they form salts.

A preferred group of the phenylalanine derivatives provided by the present invention comprises those compounds of formula I in which $R_2$ represents a hydrogen atom, and salts thereof. Interesting phenylalanine derivatives provided by the invention comprises those compounds of formula I in which $R_1$ represents a hydroxy, methoxy, benzyloxy, t-butoxy, allyloxy or 2-butenyloxy group, $R_3$ represents a hydrogen atom or an acetyl, carbobenzoxy or t-butoxycarbonyl group and $R_4$ represents an alkanoyl group containing from 2 to 8 carbon atoms or a benzoyl, ethoxycarbonyl, dimethylaminocarbonyl, mesyl, carboxymethyl, allyl, 2-butenyl or 2-propynyl group, and salts thereof. Another interesting group of the phenylalanine derivatives provided by the invention comprises those compounds of formula I in which $R_3$ represents a hydrogen atom, and salts thereof. In accordance with this invention, compounds of the formula

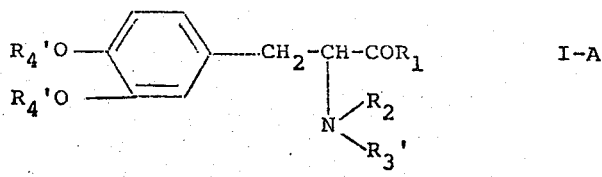

wherein $R_1$ and $R_2$ are as above and $R_3'$ is as $R_3$ except hydrogen and $R_4'$ is a substituent containing from 1 to 18 carbon atoms selected from the group consisting of

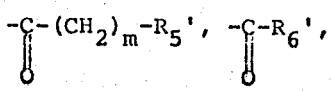

—$CH_2$—$(CH_2)_n$—$R_7'$, alkylsulfonyl, alkoxymethyl; $R_7'$ is alkenyl, alkynyl, alkoxyalkyl, cyano, alkoxycarbonyl, alkenylalkoxycarbonyl, alkynylalkoxycarbonyl, phenylalkoxycarbonyl, aminocarbonyl, alkylaminocarbonyl and dialkyalaminocarbonyl; $m$ an $n$, $R_5'$ and $R_6'$ are as above; with the proviso that $R_3'$ and $R_4'$ are different substituents are prepared by treating a compound of the formula:

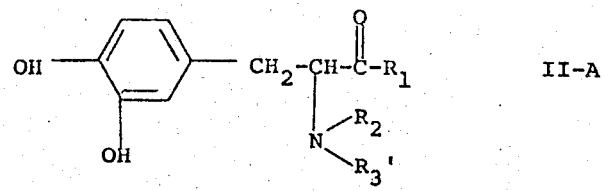

wherein $R_1$, $R_2$, $R_3'$ are as above; or salt thereof with an agent furnishing the group $R_4'$.

On the other hand, a compound of the formula:

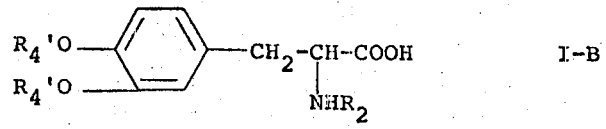

wherein $R_2$ and $R_4'$ are as above; is produced from a compound of the formula:

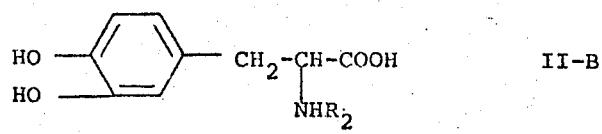

wherein $R_2$ is as above;
by treating the compound of formula II-B after protection of the $NHR_2$ group by complex formation with a copper (II) salt, with an agent which furnishes the group $R_4'$ and then cleaving the copper (II) complex.

The compounds of formula II-A above can be prepared from a dihydroxyphenylalanine compound of the formula:

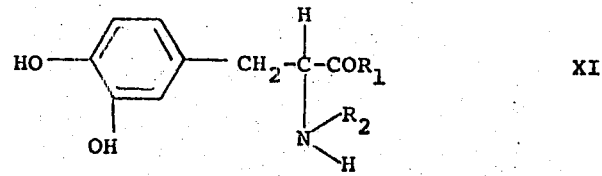

wherein $R_1$ and $R_2$ are as above; or a salt thereof.

A solution containing the compound of the formula XI is treated with boric acid or a borate salt while maintaining a pH value of at least about 7. Borax is preferably used, although other salts of boric acid such as, for example, the alkali metal metaborates (e.g., sodium metaborate) and the alkali metal pentametaborates (e.g., potassium pentaborate) can also be used. Water is preferably used as the solvent, although mixtures of water with an inert solvent such as, for example, tetrahydrofuran, dioxan, dimethylsulfoxide or dimethylformamide can also be used. The treatment is preferably carried out at a temperature between about 0° and about 70°C. The treatment is preferably carried out while maintaining a pH value of between about 7 and 11; this being expediently effected by the addition of caustic alkali or an organic base such as triethylamine or pyridine.

Those dihydroxyphenylalanines of formula XI in which $R_1$ represents an alkenylalkoxy group (e.g., 2-butenyloxy or allyloxy) or an alkynylalkoxy group (e.g., 2-propynyloxy) are new. They can be prepared, for example, by esterifying the corresponding acid of formula XI with an alkenyl- or alkynyl-substituted alkanol, especially in the presence of an acidic catalyst such as hydrochloric acid, p-toluenesulfonic acid or thionyl chloride. The alcohol can be used in a large excess, whereby it then simultaneously serves as the solvent.

The treatment of a dihydroxyphenylalanine of formula XI or of a salt thereof with boric acid or with a borate salt in the aforementioned manner yields a boric acid complex of a compound of formula XI or of a salt thereof wherein the two phenolic hydroxy groups are esterified with boric acid. This boric acid complex is subsequently reacted with an agent furnishing an acyl group $R_3'$. In this manner, a boric acid complex of a compound of formula II-A or a salt thereof is obtained. The reaction can be carried out, for example, by reacting the boric acid complex of a compound of formula XI or of a salt thereof with the corresponding acid halide, preferably the chloride or bromide, or with the corresponding acid anhydride or acid azide. The reaction medium, reaction temperature and pH employed are preferably the same as in the preparation of the boric acid complex of a compound of formula XI.

The resulting boric acid complex of a compound of formula II-A or salt thereof is subsequently subjected to an acidic hydrolysis. Preferably, a basic aqueous solution prepared in the manner described earlier is adjusted to a pH of about 1 to 4 with an acidic agent. The boric acid complex is thereby cleaved and there is obtained the compound of formula II-A. As acidic agents, there are preferably used mineral acids such as sulfuric acid, hydrochloric acid, phosphoric acid, etc. The acidic hydrolysis is preferably carried out using the same solvents and at the same temperatures in the preparation of the boric acid complex of a compound of formula XI described earlier.

The preparation of the starting materials of formula II-A is preferably carried out in situ starting from a dihydroxyphenylalanine of formula XI. The boric acid complexes obtained are preferably converted in solution directly (i.e., without isolation) into the starting materials of formula II-A.

The treatment of a starting material of formulae II-A or II-B or of a salt thereof with an agent furnishing the group $R_4'$ in accordance with one embodiment of the present process can be carried out under the conditions which are useful for acylation or alkylation reactions. In the compound of formula II-B, the $NHR_2$ group is first protected by complex-formation with a copper (II) salt before the treatment with the agent. Copper sulfate is preferably used. The complex-formation is carried out at basic pH, i.e., at a pH greater than 7. The complexformation with the copper (II) salt is preferably carried out in water or in a mixture of water with an inert organic solvent such as, for example, dimethylformamide, dimethylsulfoxide, tetrahydrofuran or dioxan.

The introduction of an acyl group as $R_4'$ into a starting material of formula II-A or salt thereof or into a complex formed from the compound of formula II-B with a copper (II) salt can be carried out, by treatment of the compound of formula II-A or the complex with a corresponding acid halide (preferably the chloride or bromide), acid anhydride or acid azide furnishing the acid group $R_4'$. According to another embodiment, the compound of formula II-A or the complex of formula II-B can be treated with an activated ester. The acid group of the activated ester yields the group $R_4'$ which is to be introduced. For example, there can be used an ester of the corresponding acid with n-hydroxysuccinimide, n-hydroxyphthalimide or p-nitrophenol. The introduction of the acid group $R_4'$ is preferably carried out in the presence of a basic agent, for example, an alkali metal carbonate such as potassium carbonate, magnesium oxide, pyrridine, triethylamine, etc. An inert organic solvent such as benzene, toluene, methylene chloride, tetrahydrofuran, dimethylformamide or dimethylsulfoxide can be present, if desired. The treatment is preferably carried out at a temperature between about 0°C. and the boiling point of the mixture. The treatment can, however, also be carried out in an aqueous medium which can, if desired, contain an inert organic solvent such as, for example, tetrahydrofuran, dioxan, dimethyl sulfoxide or dimethylformamide. The treatment is then preferably carried out at a pH between about 5 and 9 which is attained by the simultaneous addition of alkali (e.g., sodium hydroxide or potassium hydroxide). When the treatment is carried out in an aqueous medium the temperature preferably lies between about 0° and about 50°C.

The substituted alkyl group $-CH_2-(CH_2)_m-R_7'$, is introduced by treating the compound of formula II-A or the copper complex of formula II-B with a compound of the formula:

$$R_9Z,$$

or $$(R_9)_2SO_4$$

wherein $R_9$ is $-CH_2-(CH_2)_mR_7'$; and
$R_7'$ is as above; and Z is a leaving group. Z can represent any conventional leaving atom or group. Among the conventional groups which Z can represent are included chlorine, bromine or iodine atoms, substituted sulfonyloxy groups, for example, a lower alkanesulfonyloxy group such as the methanesulfonyloxy group, the benzenesulfonyloxy group, a lower alkylbenzenesulfonyl group such as the p-toluenesulfonyloxy group or a halobenzenesulfonyloxy group such as the p-bromobenzenesulfonyloxy group. The treatment is preferably carried out in the presence of an alkali metal carbonate such as potassium carbonate or sodium carbonate or in the presence of an aqueous alkali. If desired, the starting material of formula II-A or the copper complex of formula II-B is first converted at the two phenolic hydroxy groups into the corresponding alkali metal salt (for example, by treatment with an alkali metal hydride) and the resulting salt is subsequently treated with the agent furnishing the group $R_9$. According to a further embodiment, the starting material of formula II-A or copper complex of formula II-B or a salt thereof is treated with a diazo compound furnishing the group $R_9$ (e.g., diazoacetic acid ethyl ester), preferably in a large excess.

As solvents for the introduction of the substituted alkyl group $R_9$, there can be used the usual inert organic solvents; for example, acetone, dimethylformamide, dimethylsulfoxide or tetrahydrofuran. The temperature at which the reaction is carried out is not critical, but it preferably lies between about 0°C. and the boiling point of the mixture. If the treatment is carried out under anhydrous conditions, a carboxylic acid of formulae II-A or II-B which may be used as the starting material is converted into the corresponding ester.

The copper complex of the compound of formula II-B is cleaved after the acylation or alkylation by treatment with an acidic agent to yield a compound of formula I-B. The cleavage of the copper (II) complex is preferably carried out using a mineral acid such as hydrochloric acid or sulfuric acid or an organic acid such as, for example, a lower alkanecarboxylic acid (e.g., acetic acid). The cleavage of the copper complex can be carried out at a temperature between room temperature and the boiling temperature of the reaction mixture.

In accordance with another embodiment a compound of the formula:

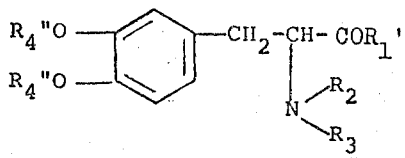

I-C wherein $R_2$ and $R_3$ are as above;
$R_1'$ is as $R_1$ except hydroxy,
$R_4''$ is a substituent containing from 1 to 18 carbon atoms selected from the group consisting of

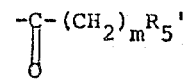

and

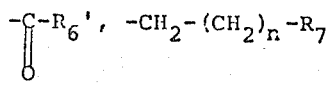

alkylsulfonyl and $R_5'$, $R_6'$, $R_7$, $m$ and $n$ are as above;
with the proviso that $R_3$ and $R_4''$ are different substituents, or salt thereof is prepared by esterifying a compound of the formula:

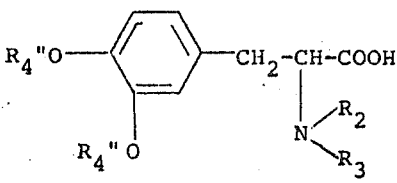

III wherein $R_2$, $R_3$ and $R_4''$ are as above.

The esterification of an acid of formula III to produce the ester of formula I-C in accordance with another embodiment of the present process is carried out by reacting the compound of formula III with the corresponding diazo compound (e.g., diazomethane, diazoethane, diphenyldiazomethane, etc.). The esterification is preferably carried out in the presence of an inert organic solvent such as diethyl ether, tetrahydrofuran, dioxan, dimethylformamide, methylene chloride or ethyl acetate, preferably at a temperature between about 0°C. and the boiling point of the mixture. Another method of esterifying the acid of formula III is by reacting this acid with an olefin furnishing the corresponding ester group. This addition is preferably effected in the process of a strong acid such as, for example, p-toluenesulfonic acid, sulfuric acid or hydrochloric acid. The Lewis acids (e.g., borontrifluoride) can also be used for this purpose. This esterification method is preferably carried out in an organic solvent such as, for example, tetrahydrofuran, dioxan, dimethylformamide or dimethylsulfoxide. If desired, a large excess of the olefin can be used, whereby it simultaneously serves as the solvent. This esterification method is expediently carried out at a temperature between about −30°C. and +70°C. If desired, it can be carried out under pressure or at a pressure up to about 50 atmospheres (gauge). A further method for the esterification of an acid of formula III can be carried out by reacting the acid with an inorganic base such as, for example, potassium carbonate or a substituted organic base such as triethylamine or dicyclohexylamine and with a compound of the formula:

$$R_{10}Z$$

or $$(R_{10})_2 SO_4$$

wherein Z is as above and $R_{10}$ is alkyl, alkenylalkyl, alkynylalkyl or phenylalkyl. This reaction is preferably carried out in the presence of an inert organic solvent; for example, dimethylformamide, dimethylsulfoxide or tetrahydrofuran. The reaction is expediently carried out at a temperature between about 0°C. and the boiling point of the reaction mixture.

An acid of formula III where $R_4''$ is $-CH_2-(CH_2)_n-R_7$ in which $R_7$ is an alkenyl, alkynyl, alkoxyalkyl, carboxy, alkoxycarbonyl, alkenylalkoxycarbonyl, alkynylcarbonyl, phenyl-substituted alkoxycarbonyl, aminocarbonyl, alkylaminocarbonyl or dialkylaminocarbonyl can also be esterified by reacting the acid of formula III with the corresponding alcohol furnishing this $R_1'$ group. This reaction is preferably carried out in the presence of an acidic catalyst such as hydrochloric acid, sulfuric acid, p-toluenesulfonic acid or thionyl chloride. A large excess of the alcohol is preferably used, whereby it simultaneously serves as the solvent. The temperature at which this esterification is carried out is not critical, but it preferably lies between about 0°C. and the boiling point of the mixture. In this esterification method, a t-alkoxycarbonyl or nitro-substituted phenylthio group denoted by $R_3$ which may be present is cleaved off. An alkoxycarbonyl group (which may be alkenyl-, alkynyl- or phenyl-substituted) denoted by $R_4''$ present is re-esterified depending on the alcohol chosen for the esterification.

In all of the methods described earlier for the esterification of an acid of formula III, a carboxyalkyl group $R_4''$ which may be present is esterified.

In accordance with another embodiment of this invention, a compound of the formula:

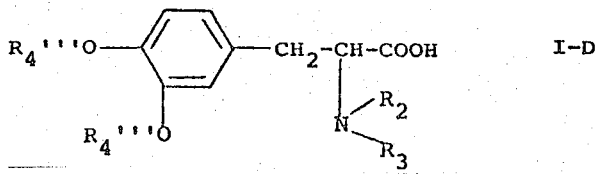

wherein $R_2$ and $R_3$ are as above; and $R_4'''$ is a substituent containing 1 to 18 carbon atoms consisting of alkylsulfonyl, alkoxymethyl, alkenylalkyl, alkynylalkyl, alkoxyalkylalkyl, cyanoalkyl, carboxyalkyl, aminocarbonyl, alkylaminocarbonyl or dialkylaminocarbonyl; with the proviso that $R_3$ and $R_4'''$ are different substituents; is prepared by subjecting an ester of the formula:

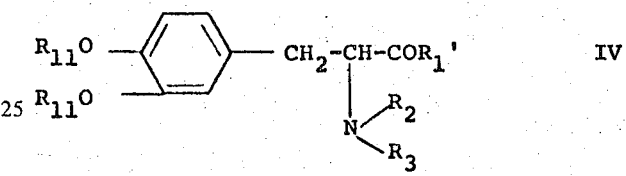

wherein $R_1'$, $R_2$ and $R_3$ are as above; $R_{11}$ is a substituent containing from 1 to 18 carbon atoms selected from the group consisting of alkylsulfonyl, alkoxymethyl and $-CH_2-(CH_2)_n-R_7$, and $R_7$ and $n$ are as above, with the proviso that $R_3$ and $R_{11}$ are different substituents, to mild basic hydrolysis.

The mild basic hydrolysis of an ester of formula IV in accordance with yet another embodiment of the present process is preferably carried out by treating an aqueous or lower-alkanoic solution of an ester of formula IV, if desired in admixture with an inert organic solvent such as tetrahydrofuran or dioxan, with a dilute inorganic base (e.g., with sodium hydroxide, potassium hydroxide or ammonia) or with a quaternary amine such as, for example, tetramethylammonium hydroxide. The mild basic conditions for this hydrolysis are preferably achieved by employing a temperature between about 0° and 50°C. Nonquaternary organic bases such as aqueous triethylamine or aqueous pyridine can also be used. Alkoxycarbonyl groups (which may be alkenyl-, alkynyl- or phenyl-substituted) denoted by $R_{11}$ which may be present are hydrolyzed to the corresponding carboxylalkyl group by this mild basic hydrolysis.

In accordance with this invention, compounds of the formula:

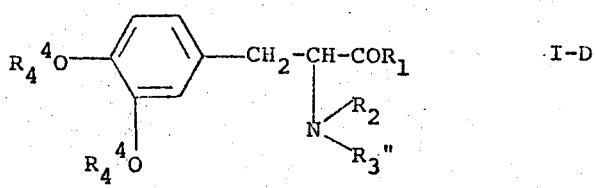

wherein $R_1$ and $R_2$ are as above; and $R_3''$ is a substituent containing from 2 to 18 carbon atoms selected from the group consisting of

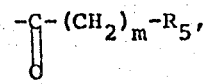

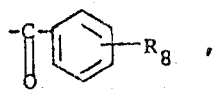

alkenoyl and alkynoyl; $R_4^4$ is a substituent containing from 1 to 18 carbon atoms selected from the group consisting of

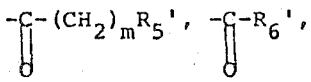

—$CH_2$—$(CH_2)_n$—$R_7'$, and alkylsulfonyl,
$n$, $m$, $R_5$, $R_6'$, $R_7'$, and $R_8$ are as above;
and $R_3''$ and $R_4^4$ represent different substituents;
are prepared by reducing a cinnamic acid derivative of the formula:

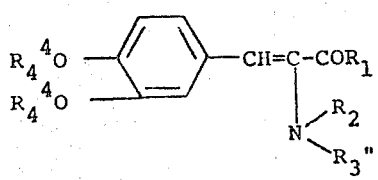

wherein $R_1$, $R_2$, $R_3''$, and $R_4^4$ are as above.

The cinnamic acid derivative of the formula V can be prepared, for example, by condensing 3,4-dihydroxybenzaldehyde with the corresponding N-acylglycine in the presence of acetic acid anhydride and sodium acetate with heating in glacial acetic acid. The condensation product, which is the corresponding 0,0'-diacetylated azlactone, is subsequently converted into the corresponding N-acyl-3,4-dihydroxycinnamic acid derivative of the general formula:

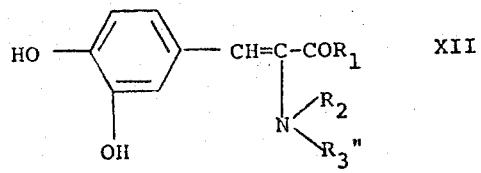

wherein $R_1$, $R_2$ and $R_3''$ are as above.

Treatment of the azlactone with, for example, sodium hydroxide in aqueous methanol yields, with simultaneous elimination of the two acetyl groups in the 0,0'-position, the corresponding acid of formula XII. Treatment with potassium carbonate or sulfuric acid in a corresponding alkanol which may be alkenyl-, alkynyl- or phenyl-substituted yields a corresponding ester of formula XII. The N-acyl-3,4-dihydroxycinnamic acid derivative of formula XII thus obtained are subsequently acylated or alkylated in a manner known per se, to obtain the desired cinnamic acid derivatives of formula V. For the introduction of an acid group $R_4^4$, a N-acyl-3,4-dihydroxycinnamic acid derivative can be reacted, for example, with the corresponding acid halide (preferably the chloride or bromide), acid anhydride or acid azide furnishing the acid group $R_4^4$. The substituted-alkyl groups $R_4^4$ can be introduced, for example, by treating a N-acyl-3,4-dihydroxycinnamic acid derivative of formula XII with the corresponding alkyl halide, especially the chloride, bromide or iodide.

The reduction of a cinnamic acid derivative of formula V wherein $R_4^4$ represents other than an alkenyl- or alkynyl-substituted alkyl group in accordance with a further embodiment of the present process can be carried out, for example, by treatment with catalytically activated hydrogen. As catalysts there can be used, for example, palladium, Raney-nickel, Raney-cobalt, platinum or ruthenium. It is preferred to carry out this treatment in an inert solvent; for example in water, in a lower alkanol such as methanol or ethanol, in an organic acid such as acetic acid or in dimethylformamide, tetrahydrofuran or dimethyl sulfoxide. In so doing, unsaturated groups which are present are hydrogenated. α-Phenyl-alkoxycarbonylalkyl groups denoted by $R_4^4$ are converted into carboxyalkyl groups unless Raney-cobalt is used as the catalyst.

Those cinnamic acid derivatives of formula V where $R_4^4$ represents a substituted-alkyl group can also be reduced with the aid of an alkali metal amalgam (e.g., sodium amalgam). This reduction is preferably carried out in an inert solvent, for example, in water and/or a lower alkanol. In so doing, α-alkenoyl and α-alkynoyl groups denoted by $R_3''$ are converted into the corresponding saturated groups, while other unsaturated groups denoted by $R_3''$ and $R_4^4$ are, however, retained in their original form. Ester groups in the molecule are hydrolyzed, but they can, however, be retained to a large extent when the reduction is carried out in the presence of an acidic agent, for example, acetic acid, at a pH of about 7 to 9.

The temperature at which the reduction of a cinnamic acid derivative of formula V is carried out preferably lies at from about 0° to 80°C.

In accordance with another embodiment of this invention, a compound of the formula:

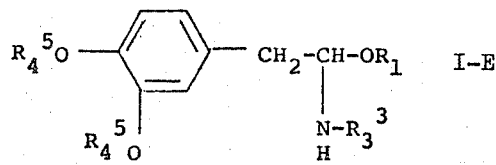

wherein $R_3^3$ is hydrogen or a substituent containing from 1 to 18 carbon atoms selected from the group consisting of alkoxy-carbonyl, phenylalkoxycarbonyl, amino-carbonyl, alkylaminocarbonyl or dialkylaminocarbonyl; $R_4^5$ a substituent containing from 1 to 18 carbon atoms selected from the group consisting of alkenylalkyl, alkynyl-alkyl, alkoxyalkylalkyl, or cyanoalkyl; and $R_1$ is as above;
is obtained from an isocyanate of the formula:

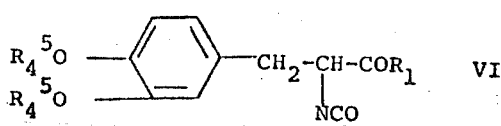

wherein $R_1$ and $R_4^5$ are as above;
by treatment with an alcohol or by hydrolysis.

The isocyanate starting materials of formula VI can be prepared, for example, by reacting a correspondingly substituted benzyl halide with an alkali metal salt of a correspondingly substituted malonic acid ester (e.g., the sodium salt) in an inert organic solvent (e.g., an alkanol, benzene or dimethylformamide) at an elevated temperature. By treating the reaction product obtained with about an equimolar amount of hydrazine, one of the two ester groups is converted into the hydrazide group. An acid hydrazide thus obtained is then converted by treatment with sodium nitrite into the corresponding acid azide which by heating in an inert solvent is converted into the corresponding isocyanate of formula VI in which $R_1$ represents an ester group. Where a corresponding acid of formula VI is desired, the remaining ester group in the acid hydrazide obtained as described earlier is saponified in a manner known per se. The acid hydrazides thus obtained are converted into the corresponding isocyanates of formula VI in the manner described earlier.

The treatment of an isocyanate of formula VI with an alkanol which may be phenyl-substituted in accordance with yet a further embodiment of the present process yields a compound of formula I-E in which $R_3^3$ represents an alkoxycarbonyl or phenylalkoxycarbonyl group. Treatment of an isocyanate of formula VI with ammonia or an alkylamine or a dialkylamine yields a compound of formula I in which $R_3$ represents an aminocarbonyl group which may be alkyl-substituted. It is preferred to carry out the treatment in an inert organic solvent such as benzene, toluene or tetrahydrofuran or in the corresponding alkanol or phenylalkanol. The treatment is preferably carried out at a temperature between about 0°C. and the boiling point of the mixture.

The hydrolysis of an isocyanate of formula VI in accordance with a still further embodiment of the present process yields a compound of formula I in which $R_1$ represents a hydroxy group and $R_2$ and $R_3$ each represent a hydrogen atom. The hydrolysis may be carried out in an acidic or basic medium; for example, by treatment with an aqueous acid such as hydrochloric acid, sulfuric acid or trifluoroacetic acid, if desired in admixture with an inert organic solvent such as glacial acetic acid, dioxan or dimethyl sulfoxide, or by treatment with aqueous alkali (e.g., sodium hydroxide or potassium hydroxide), optionally in admixture with an inert organic solvent such as a lower alkanol, dioxan or dimethyl sulfoxide. In the case of a basic hydrolysis, there is firstly obtained a carbamic acid salt corresponding to a compound of formula I, which is converted by acidification into the corresponding carbamic acid which spontaneously decarboxylates. The hydrolysis is expediently carried out at a temperature between about 0°C. and the boiling point of the mixture.

In accordance with another embodiment of this invention, a compound of the formula:

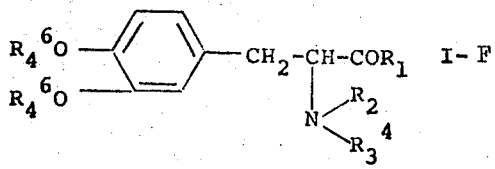

wherein $R_1$ and $R_2$ are as above; and $R_3^4$ is hydrogen or a substituent containing from 1 to 18 carbon atoms selected from the group consisting of

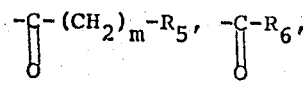

and phenylthio, and $R_4^6$ is a substituent containing from 1 to 18 carbon atoms selected from the group consisting of alkylsulfonyl, phenylalkoxycarbonylalkyl, alkenylalkyl, alkynylalkyl, cyanoalkyl, alkoxycarbonylalkyl, alkenylalkoxycarbonylalkyl, alkynylalkoxy-carbonylalkyl, aminocarbonylalkyl, alkylaminocarbonylalkyl and dialkylaminocarbonylalkyl; and m, $R_5$, $R_6$ and $R_8$ are as above; with the proviso that $R_3^4$ and $R_4^6$ are different substituents;
is prepared from a malonic acid ester of the formula:

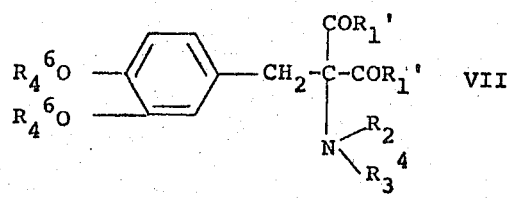

wherein $R_4^6$, $R_1'$, $R_2$ and $R_3^4$ are as above; by hydrolysis and decarboxylation.

The malonic acid esters of formula VII in which $R_3^4$ is other than a hydrogen atom can be prepared, for example, by condensing a correspondingly substituted benzyl halide with an alkali metal salt of a correspondingly substituted acylaminomalonic acid ester, preferably the sodium salt, in an inert organic solvent, for example, in ethanol or dimethylformamide. Aminomalonic acid esters of formula VII in which $R_3^4$ is a hydrogen can be prepared, for example, by reacting a correspondingly substituted benzyl halide with an alkali metal salt of a malonic acid ester. The substituted malonic acid ester obtained can subsequently be reacted with chlorine or bromine in an inert solvent (e.g., methylene chloride) at an elevated temperature. The resulting α-halo-substituted malonic acid ester can subsequently be converted by the action of ammonia or an amine of the formula $R_2NH_2$, wherein $R_2$ is as above into the desired malonic acid ester starting material of formula VII where $R_3^4$ is a hydrogen atom.

The hydrolysis of a malonic acid ester of formula VII in accordance with an embodiment of the invention can be carried out, for example, as follows: A malonic acid ester of formula VII wherein $R_3^4$ is other than a hydrogen atom can be converted by basic hydrolysis and subsequent decarboxylation into a corresponding compound of formula I-F. Depending upon the amount of basic agent used, there is obtained a corresponding acylaminomalonic acid half-ester or the corresponding acylaminomalonic acid. In an excess of base is added, the alkoxycarbonylalkyl group (which may be alkenyl-, alkynyl- or phenylsubstituted) denoted by $R_4^6$ which may be present is saponified to the carboxylalkyl group. The hydrolysis is preferably carried out in aqueous solution, if desired in the presence of an inert organic solvent such as a lower alkanol, tetrahydrofuran or dioxan. The hydrolysis is preferably carried out at a temperature between about 0°C. and the boiling point of the mixture.

The malonic acid derivatives obtained in the manner described earlier are subsequently decarboxylated; for example, by heating in an inert organic solvent (e.g., tetrahydrofuran, dioxan, dimethyl sulfoxide, dimethylformamide) or in water to about 50° to 150°C. if desired in the presence of a catalytic amount of a sulfonic acid such as p-toluenesulfonic acid, or by heating the malonic acid derivatives up to their melting point.

The malonic acid esters of formula VII in which $R_4^6$ is other than an alkylsulfonyl group can be subjected to an acidic hydrolysis; for example, by treatment with a mineral acid in aqueous solution, if desired in admixture with a lower alkanol or a lower alkanecarboxylic acid such as glacial acetic acid, preferably at a temperature between room temperature and the boiling point of the mixture. In this manner there are obtained compounds of formula I-F where $R_1$ represents a hydroxy group and $R_3^4$ represents a hydrogen atom. In this acidic hydrolysis ester, cyano and aminocarbonyl groups which may be present are saponified to carboxy groups.

In accordance with another embodiment of this invention, a compound of the formula:

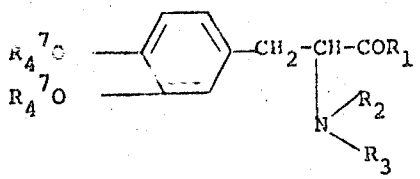

wherein $R_1$ and $R_2$ are as above; and $R_4^7$ is an acyl substituent containing 2 to 18 carbon atoms selected from the group consisting of alkanoyl, alkoxyalkanoyl, phenylalkanoyl, alkoxyphenylalkanoyl, halophenylalkanoyl, benzoyl, alkoxybenzoyl, halobenzoyl, alkenoyl, alkynoyl, alkoxycarbonyl, phenylalkoxycarbonyl, aminocarbonyl, alkylaminocarbonyl, dialkylaminocarbonyl and alkylsulfonyl; is formed through treating a salt of the formula:

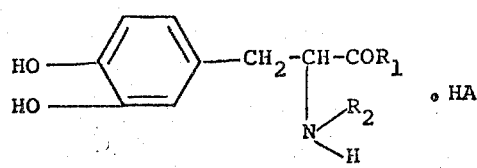

wherein $R_1$ and $R_2$ are as above, and A is an anion of an acid,
under anhydrous conditions with an acylating agent or treating a compound of the formula:

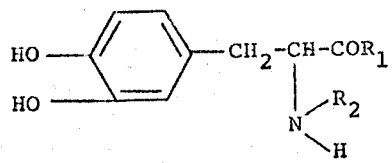

wherein $R_1$ and $R_2$ are as above;
with a Lewis acid, reacting the product obtained with an acylating agent and then subjecting this product to a mild hydrolysis.

The salts of formula VIII can be prepared, for example, by treating a corresponding base, i.e., the compound of formula IX with a proton-releasing acid such as, for example, perchloric acid, sulfuric acid or trifluoroacetic acid. There are thereby obtained salt starting materials of formula VIII. In this manner, the amino group in formula VIII is protected against attack by agents furnishing the acyl groups. The salt starting material of formula VIII can thereby be selectively acylated or sulfonylated at the phenolic hydroxy groups.

The introduction of an acyl group $R_4^7$ into a salt of formula VIII is expediently carried out by treating the salt with an acylating agent such as the corresponding acid halide, especially the chloride or bromide, or with the corresponding acid anhydride. As the solvent there can be used, for example, a lower alkanecarboxylic acid such as glacial acetic acid. The treatment is preferably carried out at a temperature between about 0°C. and the boiling point of the mixture.

In converting the compound of formula IX to the compound of formula I-G, the unsubstituted amino group in a compound of formula IX is first protected by treatment with a Lewis acid such as, for example, aluminum trichloride or tin tetrachloride. In this manner, it is possible to introduce acid groups by acylation at both phenolic hydroxy groups without affecting the amino group. Acylation is carried out under anhydrous conditions. The product obtained can subsequently be reacted with an acylating agent to furnish the group $R_4^7$. Acylation is carried out by reaction with the corresponding acid halide, especially the chloride or bromide, or with the corresponding acid anhydride. As solvents for this reaction there can be used the solvents usually employed in Friedel-Crafts reactions; for example, chlorobenzene, nitrobenzene, tetrachloroethane, carbon tetrachloride, carbon disulfide, etc. The reaction is preferably carried out at a temperature between about −50°C. and +50°C., preferably between about −10°C. and +30°C. After completion of the reaction, the product obtained is subjected to a mild hydrolysis. This mild hydrolysis is preferably carried out by treatment with water or a dilute aqueous mineral acid (e.g., hydrochloric acid or sulfuric acid) at a temperature between about 0°C. and room temperature. The treatment is preferably carried out at about 0°C. using ice-water or a mixture of ice and an aqueous mineral acid.

A compound of the formula:

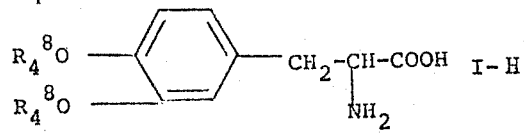

wherein $R_4^8$ is $-CH_2-(CH)_nR_{17}$;
$R_{17}$ is alkenyl, alkynyl, alkoxyalkyl, or carboxy; and
$n$ is as above;
can be prepared by hydrolyzing a compound of the formula:

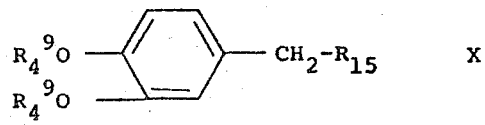

wherein $R_4^9$ is $-CH_2(CH_2)_n-R_7$; and $n$ and $R_7$ are as above; and $R_{15}$ is

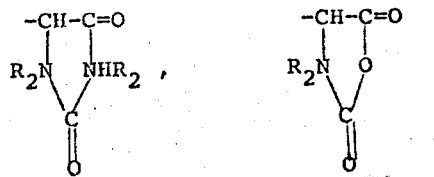

and

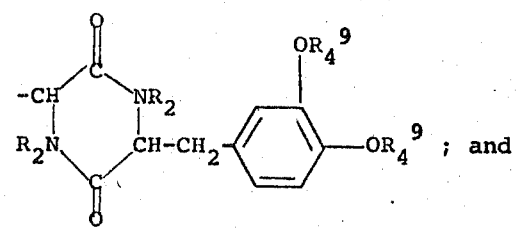

$R_2$ is as above.

The starting materials of formula X can be prepared, for example, by reacting a correspondingly substituted benzaldehyde with a correspondingly substituted hydantoin in a lower alkanol or a lower alkanecarboxylic acid in the presence of a catalyst (e.g., sodium acetate or p-toluenesulfonic acid) or in the presence of a base (e.g., piperidine or pyridine) to give a correspondingly substituted benzylidenehydantoin. If, instead of a hydantoin, a correspondingly substituted oxazolidine-2,5- dione or piperazine-2,5-dione is employed in this reaction, there are obtained the corresponding benzylideneoxazolidine-2,5-diones or bis(benzylidene)-substituted piperazine-2,5-diones respectively. The benzylidene-substituted compounds thus obtained can be converted into a starting material of formula X with the aid of a complex metal hydride such as sodium or lithium borohydride or with the aid of sodium amalgam.

The hydrolysis of a compound of formula X in accordance with a still further embodiment of the present process can be carried out in an acidic or in a basic medium. As the acidic hydrolyzing agent there can be used, for example, aqueous mineral acids such as hydrochloric acid or sulfuric acid. As the basic hydrolyzing agent there is preferably used an aqueous alkali such as sodium hydroxide or potassium hydroxide. The hydrolysis is preferably carried out in an aqueous medium, if desired in the presence of an inert organic solvent such as a lower alkanol, tetrahydrofuran or dioxan. The hydrolysis is expediently carried out at a temperature between about 0°C. and the boiling point of the mixture. In this manner there are obtained compounds of formula I in which $R_1$ represents a hydroxy group, $R_2$ and $R_3$ each represent a hydrogen group and $R_4$ represents an alkyl group which is substituted by alkenyl, alkynyl, alkoxyalkyl or carboxyl, i.e., cyano, ester and amide groups which may be present are saponified.

In compounds of formula I obtained in which $R_3$ represents an acyl group, this acyl group can be cleaved off in the manner described hereinafter while retaining the O,O'-substitution. In so doing, there are obtained the selectively O,O'-substituted/N-unsubstituted compounds of the formula:

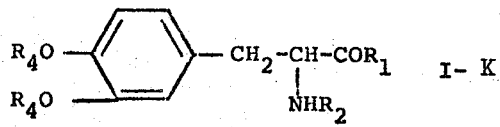

wherein $R_1$, $R_2$ and $R_4$ are as above.

The compound of formula I-K represents a preferred group of compounds of formula I provided by the invention.

The cleavage of an acid group denoted by $R_3$ can be carried out as follows:

A. A benzyloxycarbonyl group bound to the nitrogen atom can be cleaved off by reduction. Where $R_4$ represents other than an alkenylalkyl or alkynylalkyl group, this reduction can be carried out using catalytically activated hydrogen. As catalysts there can be used, for example, palladium Raney-nickel, platinum or ruthenium. It is preferred to carry out this reduction in an inert solvent; for example, in water in a lower alkanol such as methanol or ethanol, in an organic acid such as acetic acid or in dimethylformamide, tetrahydrofuran or dimethyl sulfoxide. This reduction is expediently carried out at a temperature between 0° and 80°C. Unsaturated groups which are present are converted into the corresponding saturated groups during this reduction. α-Phenylalkoxycarbonyl groups which are present are converted into carboxy groups.

A benzyloxycarbonyl group denoted by $R_3$ in a compound of formula I in which $R_4$ represents an alkenyl-, alkynyl- or carboxy-substituted alkyl group and $R_1$ represents a hydroxy group can also be cleaved off by treatment with sodium in liquid ammonia.

Benzyloxycarbonyl groups denoted by $R_3$ can also be cleaved off by treatment with hydrogen bromide in an inert organic solvent such as glacial acetic acid, nitromethane, chloroform, ethyl acetate or ether or by treatment with trifluoroacetic acid, if desired with the addition of phenol, resorcinol or anisole. This cleavage is expediently carried out at a temperature between about room temperature and the boiling point of the mixture, preferably at an elevated temperature.

B. A lower t-alkoxycarbonyl group or a nitro-substituted phenylthio group bound to the nitrogen atom in a compound of formula I can be cleaved off by treatment with an acidic agent. A lower t-alkoxycarbonyl group is expediently cleaved off in an organic solvent such as, for example, glacial acetic acid, ethyl acetate, methylene chloride, ether or tetrahydrofuran. As acidic agents for this cleavage there are preferably used strong acids such as hydrogen chloride, p-toluenesulfonic acid or trifluoroacetic acid. This cleavage is preferably carried out at a temperature of from about 0° to 70°C. In a preferred embodiment, the t-butoxycarbonyl group is cleaved off. In so doing, other t-alkoxycarbonyl groups present are converted into carboxy groups.

The cleavage of a nitro-substituted phenylthio group can be carried out, for example, by treatment in an inert organic solvent such as glacial acetic acid, ether, tetrahydrofuran or chloroform with gaseous hydrochloric acid or by treatment in aqueous solution, if desired in the presence of an inert organic solvent such as tetrahydrofuran, dimethylformamide, dimethyl sulfoxide or a lower alkanol, with a mineral acid such as, for example, hydrochloric or sulfuric acid, in the presence of thiophenol, thioacetamide or rhodanine at a pH between about 1 and 4. This cleavage is preferably carried out at a temperature between about 0°C. and the boiling point of the mixture.

C. A substituent denoted by $R_3$ in a compound of formula I in which $R_4$ represents an alkyl group which is substituted by alkenyl, alkynyl, alkoxyalkyl, cyano, carboxy, alkoxycarbonyl (which may be alkenyl-, alkynyl- or phenyl-substituted) or aminocarbonyl (which may be alkyl-substituted) can be cleaved off hydrolytically without removal of the aforementioned groups denoted by $R_4$. This hydrolysis can be carried out in an acidic or in a basic medium. For the acidic hydrolysis there is preferably used an aqueous mineral acid such as hydrochloric acid or sulfuric acid or toluenesulfonic acid, if desired in admixture with an inert organic solvent such as a lower alkanol, glacial acetic acid or dioxan. For the basic hydrolysis there is preferably used an aqueous caustic alkali such as potassium hydroxide or sodium hydroxide, if desired in admixture with an inert organic solvent such as a lower alkanol, dioxan or dimethyl sulfoxide. The hydrolysis is preferably carried out at a temperature between about 0°C. and the boiling point of the mixture. In this hydrolysis, ester groups, cyano groups and aminocarbonyl groups which may be present are converted into carboxy groups.

Racemates of formula I can be resolved; for example, by subjecting an acid of formula I to a fractional crystallization with an optically active base such as quinine, brucine, dehydroabietylamine, (+)- or (−)-ephedrine or (+)- or (−)-α-methylbenzylamine. However, the optically active forms of the compounds can also be obtained by using a pure optically active starting material.

The compounds of formula I hereinbefore (the D.L-, D- and, especially, the L-form thereof) and their salts are pharmacodynamically active. They are characterized by manifold actions on the nervous system. In particular, they possess hypotensive, antipyretic and antiparkinson properties.

The compounds of formula I hereinbefore and their salts can be used as medicaments; for example, in the form of pharmaceutical preparations which contain them in association with a compatible pharmaceutical carrier. This carrier can be an organic or inorganic inert carrier material which is suitable for enteral or parenteral administration such as, for example, water, gelatin, gum arabic, lactose, starches, magnesium stearate, talc, vegetable oils, polyalkylene glycols, petroleum jelly, etc. The pharmaceutical preparations can be made up in solid form (e.g., as tablets, dragees, suppositories or capsules) or in liquid form (e.g., as solutions, suspensions or emulsions). The pharmaceutical preparations may be sterilized and/or may contain adjuvants such as preserving, stabilizing, wetting or emulsifying agents, salts for varying the osmotic pressure or buffers. They can also contain other therapeutically valuable substances.

A pharmaceutical preparation in dosage unit form can expediently contain about 10 mg. to about 1,000 mg. of active ingredient.

The pharmaceutical preparations can also contain one or more peripheral decarboxylase inhibitors, whereby a lowering of the amount of active ingredient to be administered becomes possible. As such decarboxylase inhibitors there can be used all pharmaceutically tolerable substances which inhibit the decarboxylase in the extracerebral organs and thereby prevent the decarboxylation of the active ingredient in these organs.

As the decarboxylase inhibitor there can be used a compound of the general formula:

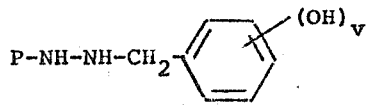

wherein P is hydrogen or amino-)lower alkanoyl) or amino-(hydroxy lower alkanoyl); and v is an integer of from 2 to 3;
or pharmaceutically acceptable salt thereof.

As Examples there can be named:
$N^1$-D,L-seryl-$N^2$-(2,3,4-trihydroxybenzyl)-hydrazide,
$N^1$-L-seryl-$N^2$-(2,3,4-trihydroxybenzyl)-hydrazide,
$N^1$-glycyl-$N^2$-(2,3,4-trihydroxybenzyl)-hydrazide,
$N^1$-D,L-tyrosyl-$N^2$-(2,3,4-trihydroxybenzyl)-hydrazide or
$N^1$-L-tyrosyl-$N^2$-(2,3,4-trihydroxybenzyl)-hydrazide
or a pharmaceutically acceptable salt of one of these compounds.

Other suitable decarboxylase inhibitors are, for example, benzylideneacetophenone, L-3-(3,4-dihydroxyphenyl)-2-methylalanine and compounds of the general formula:

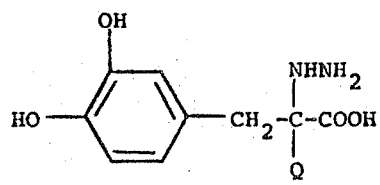

wherein Q represents a hydrogen atom or a lower alkyl group.

Where the pharmaceutical preparations contain a decarboxylase inhibitor, the proportion by weight of active ingredient to decarboxylase inhibitor expediently amounts to about 1:1 to 10:1.

Where the pharmaceutical preparations contain a decarboxylase inhibitor, a decarboxylase inhibitor can be admixed with the active ingredient and/or with the carrier materials or the preparations can be manufactured by compressing the active ingredient, optionally with a carrier material, to a core, providing this core with a coating which is resistant to gastric juice and applying thereover an external layer which contains the decarboxylase inhibitor. In this manner there is provided a pharmaceutical preparation from which, after oral administration, the active ingredient is released with delay only after the decarboxylase inhibitor has been released, preferably about 30 to 60 minutes after the decarboxylase inhibitor. This has proved to be particularly expedient. In the case of parenteral administration, the decarboxylase inhibitor is expediently administered first, preferably intravenously, and, about 30 to 60 minutes thereafter, the active ingredient is administered.

In the treatment of Parkinsonism, the active ingredient, optionally in combination with a peripheral decarboxylase inhibitor, can be administered either orally or parenterally, especially intravenously.

The amount of active ingredient to be administered per day is governed by the particular case. In general, an amount of active ingredient of about 0.1 to about 4 g., especially about 1.5 to about 3 g., will be administered orally per day. In the case of intravenous administration, the amount of active ingredient administered per day can be between about 10 mg. and about 2 g., especially about 1 g.

As has already been mentioned, the amount of active ingredient administered can be reduced by the combined administration thereof with a peripheral decarboxylase inhibitor. With such a combined administration, there are expediently used amounts of active ingredient which lie in the lower part of the ranges mentioned earlier. For example, 1 g. of active ingredient and 100 mg. of a decarboxylase inhibitor (proportion 10:1) or 500 mg. of active ingredient and 500 mg. of a decarboxylase inhibitor (proportion 1:1) can be administered orally per day.

The administration is expediently effected in individual doses divided over the day.

The following examples are illustrative but not limitative of the invention. The temperatures are in degrees centigrade, and the ether utilized in the examples is diethyl ether Example 1

20 Ml. of acetic acid anhydride and 2-N aqueous sodium hydroxide are added simultaneously, in the course of 1 hour, to a solution of 20 g. of crude N-carbobenzoxy-L-dopa in 60 ml. of 2-N aqueous sodium hydroxide and 50 ml. of water, in an argon atmosphere between 0° and 10°C in such a manner that the pH value of the mixture remains between 6.5 and 7.5. After completion of the addition, the mixture is stirred at room temperature for a further 1 hour, the pH value being held between 6.5 and 7.5 by occasional addition of 2-N aqueous sodium hydroxide, then acidified to pH 1 with 6-N aqueous sulphuric acid and extracted twice with 500 ml. of ether/benzene (4:1 parts by volume) each time. The organic extracts are washed once with 100 ml. of 2-N aqueous sulphuric acid and four times with 100 ml. of water each time, dried over sodium sulphate and evaporated at 40°C./12 mmHg. The residual N-carbobenzoxy-O,O'-diacetyl-L-dopa melts at 111°–113°C. after recrystallization from toluene; $[\alpha]_D^{25} = +6.4°$ ($c = 1$ percent, methanol).

Example 2

By the procedure of Example 1 N-carbobenzoxy-O,O'-bis (ethoxycarbonyl)-L-dopa and N-carbobenzoxy-O,O'-dibenzoyl-L-dopa of melting point 137°C. (from butyl acetate/petroleum ether) are prepared from N-carbobenzoxy-L-dopa and ethoxycarbonyl, chloride and from N-carbobenzoxy-L-dopa and benzoyl chloride, respectively.

Example 3

77 g. (0.391 mol) of L-dopa are added with stirring in an argon atmosphere to a suspension of 140 g. (0.367 mol) of borax in 700 ml. of water. The mixture is stirred for 15 minutes, adjusted to pH 9 by addition of 2-N aqueous sodium hydroxide and subsequently treated between 0° and 10°C. in the course of 3 hours with 77 g. (0.453 mol) of chloroformic acid benzyl ester in portions of about 4 ml., the pH of the mixture being held between 9 and 9.5 by addition of 2-N aqueous sodium hydroxide. The mixture is then cooled to 0°C. The undissolved material is filtered off. The filtrate is extracted twice with 500 ml. of diethyl ether each time. The ether extracts are washed once with 100 ml. of water and then discarded. The aqueous alkaline extracts are adjusted, with ice-cooling, to pH 1 with 6-N aqueous sulphuric acid and then extracted twice with 1,000 ml. of diethyl ether each time. The organic extracts are washed twice with 500 ml. of water each time, combined and dried over sodium sulphate and animal charcoal. The dried extract is evaporated under reduced pressure with the addition of toluene. Crude N-carbobenzoxy-L-dopa is obtained in the form of a pale violet-coloured glassy mass.

Example 4

A solution of 8.42 g. of N-carbobenzoxy-L-dopa benzyl ester in 40 ml. of absolute pyridine is treated dropwise with stirring in an argon atmosphere at between 0° and 10°C. with 7 ml. of octanoyl chloride. The mixture is further stirred at 0°C. for 30 minutes and at room temperature for 20 hours, then introduced into a mixture fo 100 ml. of concentrated aqueous hydrochloric acid and 300 g. of ice and extracted twice with 200 ml. of ethyl acetate each time. The organic extracts are washed with 100 ml. of ice-cold aqueous sodium hydroxide and four times with 100 ml. of saturated sodium chloride solution each time, dried over sodium sulphate and evaporated at 40°C/12 mmHg with the addition of 100 ml. of toluene. After chromatography on silica gel [0.2-0.5 mm; elution with chloroform/methanol (10:0.5 parts by volume)] and recrystallization from methanol, the oily residue yields N-carbobenzoxy-0,0'-dioctanoyl-L-dopa benzyl ester of melting point 72°–73°C.; $[\alpha]_D^{25} = -9.4°$ ($c = 1$ percent, methanol).

EXAMPLE 5

By the procedure of Example 4, N-carbobenzoxy-L-dopa benzyl ester is reacted with:

heptanoyl chloride to produce N-carbobenzoxy-0,0'-diheptanoyl-L-dopa benzyl ester of melting point 139°C.;

hexanoyl chloride to produce N-carbobenzoxy-0,0'-dihexanoyl-L-dopa benzyl ester; and valeryl chloride to produce N-carbobenzoxy-0,0'-divaleryl-L-dopa benzyl ester.

EXAMPLE 6

A mixture of 33.1 g. of N-carbobenzoxy-L-dopa, 19.6 ml. of dicyclohexylamine, 17.1 g. of benzyl bromide and 150 ml. of absolute dimethylformamide is stirred at room temperature for 14 hours. The precipitated dicyclohexylamine hydrobromide is filtered off. The filtrate is evaporated at 40°C./12 mmHg. The residue is partitioned between 900 ml. of ethyl acetate and 200 ml. of water. The aqueous phase is separated off and again extracted with 200 ml. of ethyl acetate. The organic extracts are successively washed twice with 100 ml. of 2-N aqueous hydrochloric acid each time, twice with 100 ml. of water each time, twice with 100 ml. of saturated sodium bicarbonate solution each time and twice with 100 ml. of water each time, then combined, dried over sodium sulphate and concentrated at 40°C./12 mmHg. Crude N-carbobenzoxy-L-dopa benzyl ester is obtained as a glassy mass; $[\alpha]_D^{25} = -7.3°$ ($c = 1$ percent, methanol). The product is used in the process without further purification.

Example 7

7 g. of acetic anhydride and 2-N aqueous sodium hydroxide are simultaneously introduced within 30 minutes at between 0°C. and 10°C. into a solution of 15 g. of N-(t-butoxycarbonyl)-L-dopa in 70 ml. of 1-N aqueous sodium hydroxide and 50 ml. of water in an argon atmosphere in such a manner than the pH value of the solution remains between 6.5 and 7.5. The mixture is then stirred at room temperature for a further 1 hour, the pH value being held between 6.5 and 7.5 by occasional addition of 2-N aqueous sodium hydroxide, then acidified to pH 1 with 6-N aqueous sulphuric acid and extracted twice with 300 ml. of ether each time. The organic phases are washed four times with 100 ml. of ice-water each time, combined, dried over sodium sulphate and evaporated at 30°C./12 mmHg with the addition of 100 ml. of toluene. 0,0'-Diacetyl-N-(t-butoxycarbonyl)-L-dopa is obtained as a glassy mass.

Example 8

The N-(t-butoxycarbonyl)-L-dopa used hereinbefore as the starting material can be prepared as follows:

A mixture of 100 g. (0.507 mol.) of L-dopa, 200 g. (0.525 mol) of borax and 1000 ml. of water is treated in an argon atmosphere with 2-N aqueous sodium hydroxide up to pH 9.5. Half of the crude t-butoxycarbonyl azide which has been prepared from 120 g. of t-butoxycarbonyl hydrazide is added, in one portion, to the solution obtained, which contains the boric acid complex of L-dopa. The mixture is stirred at room temperature for 6 hours, the pH being held between 9.3 and 9.8 by occasional addition of 2-N aqueous sodium hydroxide, and, after addition of the remaining t-butoxycarbonyl azide, stirred for a further 14 hours. The pH value then falls to 8.5. The mixture is adjusted to pH 9.5 by addition of 2-N aqueous sodium hydroxide, stirred for 2 hours and extracted twice with 300 ml. of diethyl ether each time. The aqueous phase, which contains the boric acid complex of N-(t-butoxycarbonyl)-L-dopa, is used in the process without isolation of this product.

The alkaline solution obtained, which contains the boric acid complex of N-(t-butoxycarbonyl)-L-dopa, is adjusted to pH 2.5 in an argon atmosphere with a 10 percent by weight aqueous citric acid solution, saturated with sodium chloride and extracted twice with 300 ml. of ethyl acetate each time. The combined organic extracts are washed ten times with 500 ml. of water each time, dried over sodium sulphate and concentrated under reduced pressure. The glassy residue is obtained crystallizes on digestion with cyclohexane. After two recrystallizations from ethyl acetate/cyclohexane, there is obtained N-(t-butoxycarbonyl)-L-dopa of melting point 148°C.; $[\alpha]_D^{25} = +16.4°$ ($c = 1$ percent in methanol).

Example 9

A solution of 26.3 g. of N-carbobenzoxy-L-dopa methyl ester in 152 ml. of absolute pyridine is treated dropwise with stirring in an argon atmosphere at between 0° and 10°C. with 26.7 ml. of octanoyl chloride. The mixture is stirred at 0°C. for 30 minutes and at room temperature for 20 hours, subsequently added to a mixture of 450 ml. of concentrated aqueous hydrochloric acid and 1,000 g. of ice and extracted twice with 100 ml. of ethyl acetate each time. The organic extracts are extracted once with 350 ml. of 1-N aqueous sodium hydroxide and 5 times with 100 ml. of saturated sodium chloride solution each time, combined, dried over sodium sulphate and evaporated at 40°C./12 mmHg. The residual crude N-carbobenzoxy-0,0'-dioctanoyl-L-dopa methyl ester is recrystallized from methanol. Colourless crystals of melting point 70°–71°C. are obtained.

Example 10

By the procedure of Example 9, N-carbobenzoxy-L-dopa methyl ester is reacted with:

heptanoyl chloride to produce N-carbobenzoxy-0,0'-diheptanoyl-L-dopa methyl ester of melting point 95°–96°C.;

hexanoyl chloride to produce N-carbobenzoxy-0,0'-dihexanoyl-L-dopa methyl ester;

valeryl chloride to produce N-carbobenzoxy-0,0'-divaleryl-L-dopa methyl ester;

butyryl chloride to produce N-carbobenzoxy-0,0'-dibutyryl-L-dopa methyl ester;

propionyl chloride to produce N-carbobenzoxy-0,0'-dipropionyl-L-dopa methyl ester;

acetyl chloride to produce N-carbobenzoxy-0,0'-diacetyl-L-dopa methyl ester of melting point 94°–96°C.; $[\alpha]_D^{25} = +3.2°$ ($c = 1$ percent methanol);

benzoyl chloride to produce N-carbobenzoxy-0,0'-dibenzoyl-L-dopa methyl ester; and ethoxy carbonyl chloride to produce N-carbobenzoxy-0,0'-bis (ethoxycarbonyl)-L-dopa methyl ester.

Example 11

A solution of 33.1 g of N-carbobenzoxy-L-dopa in 100 ml of diethyl ether is treated dropwise in the course of 1 hour at room temperature with the calculated amount of an ethereal diazomethane solution and, after the addition of 2 ml of glacial acetic acid, extracted with saturated sodium bicarbonate solution, dried over sodium sulphate and evaporated at 40°C./12 mmHg with the addition of toluene. The residual crude N-carbobenzoxy-L-dopa methyl ester is used in the process without further purification.

Example 12

A solution of 31.13 g of N-(t-butoxycarbonyl)-L-dopa methyl ester is treated dropwise in 150 ml of pyridine in an argon atmosphere at room temperature with 22 ml of dimethylcarbamoyl chloride. The solution is stirred at 70°C. for 5 hours and then evaporated at 40°C./12 mmHg with the addition of 100 ml of toluene. The residue is treated three times with 100 ml of toluene each time, evaporated at 40°C./12 mmHg and subsequently partitioned between 400 ml of ethyl acetate and 500 ml of 0.4-N aqueous ice-cold hydrochloric acid. The organic phase is separated off, washed 5 times with 100 ml of saturated aqueous sodium chloride solution each time, dried over sodium sulphate and active charcoal and evaporated at 40°C./12 mmHg with the addition of toluene. N-(t-butoxycarbonyl)-0,0'-bis(dimethylcarbamoyl)-L-dopa methyl ester is obtained as an oil.

Example 13

A solution of 15 g. of N-(t-butoxycarbonyl)-L-dopa in 200 ml. of diethyl ether is treated dropwise within 10 minutes with the calculated amount of an ethereal diazomethane solution. After the addition of 2 ml. of glacial acetic acid, the mixture is extracted with saturated sodium bicarbonate solution, dried over sodium sulphate and evaporated at 40°C./12 mmHg with the addition of toluene. After recrystallization from toluene, the residue yields N-(t-butoxycarbonyl)-L-dopa methyl ester as colourless crystals of melting point 131°–133°C. (decomposition); $[\alpha]_D^{25} = +12.3°$ ($c = 1$ percent in methanol).

Example 14

A solution of 32.0 g. of N-acetyl-L-dopa ethyl ester and 53.3 ml. of bromacetic acid ethyl ester in 300 ml. of absolute ethanol is treated dropwise in an argon atmosphere at an internal temperature of 70°C. within 30 minutes with a solution of 6.35 g. of sodium in 120 ml of absolute ethanol. The mixture is stirred at 70°C. for 2 hours and then evaporated at 40°C./12 mmHg. The residue is partitioned between 1,100 ml. of ethyl acetate and 250 ml. of saturated sodium bicarbonate solution. The organic phase is separated off, washed once with 200 ml. of water, dried over sodium sulphate and concentrated at 40°C./12 mmHg. The residual N-acetyl-0,0'-bis(ethoxycarbonylmethyl)-L-dopa ethyl ester is recrystallized from diethyl ether to yield colourless crystals of melting point 93°–94°C.; $[\alpha]_D^{25} = +16.1°$ ($c = 1$ percent in etehanol).

Example 15

7.7 G, (39.1 mmol) of L-dopa are added with stirring in an argon atomopshere to a suspension of 14.0 g. (36.7 mmol) of borax in 70.0 ml. of water. The mixture is stirred for 15 minutes and then brought to pH 10 with 2-N aqueous sodium hydroxide. The mixture is treated dropwise in the course of 2 hours at a temperature between 5° and 10°C. with 9.5 ml. of acetic anhydride (0.10 mol), the pH of the mixture being held between 10 and 10.5 by dropwise addition of 2-N sodium hydroxide, stirred at 20°–23°C. for 40 minutes and again cooled to about 5°C. The undissolved white crystals are filtered off. The filtrate is brought to pH 1 with concentrated aqueous sulphuric acid and extracted three times with 600 ml. of ethyl acetate each time. The extracts are dried over sodium sulphate and evaporated under reduced pressure. The residue is dissolved in a small amount of ethyl acetate. The boric acid residues which remain undissolved are filtered off. The filtrate is again evaporated under reduced pressure. The residue is dried under reduced pressure at 70°C. for 2 hours. Crude N-acetyl-L-dopa is obtained in the form of a light-beige, solid foam. $[\alpha]_D^{25} = +42.6°$ ($c = 0.82$ percent in methanol).

The crude product is converted into the ethyl ester with ethanolic hydrochloric acid: melting point 110°–111°C.; $[\alpha]_D^{25} = +23.5°$ ($c = 0.5$ percent in methanol).

Example 16

15.5 G. of N-(t-butoxycarbonyl)-L-dopa methyl ester, 18.2 g. of allyl bromide, 27.6 g. of potassium carbonate and 300 ml. of acetone are stirred at reflux in an argon atmosphere for 14 hours. The mixture is concentrated at 40°C./12 mmHg and partitioned between 300 ml. of ethyl acetate and 300 ml. of water. The organic phase is separated off and, after drying over sodium sulphate, concentrated at 40°C./12 mmHg. The residual N-(t-butoxycarbonyl)-0,0'-diallyl-L-dopa methyl ester is recrystallized from glacial acetic acid; melting point 79°C.; $[\alpha]_D^{25} = +5.1°$ ($c = 1$ percent in methanol).

Example 17

By the procedure of Example 16 there is manufactured: N-(t-butoxycarbonyl)-0,0'-bis(2-propynyl)-L-dopa methyl ester of melting point 73°C. (from ethyl acetate/petroleum ether); $[\alpha]_D^{25} = +4.9°$ ($c = 1$ percent in methanol) utilizing 2-propynyl bromide in place of allyl bromide.

Example 18

A mixture of 6 g. of N-(t-butoxycarbonyl)-L-dopa, 18.3 g. of crotyl bromide, 33 g. of potassium carbonate and 250 ml. of acetone is stirred under reflux conditions for 14 hours. The precipitate is filtered off and the filtrate concentrated at 40°C./12 mmHg. The residue is partitioned between 100 ml. of saturated sodium bicarbonate solution and 200 ml. of ethyl acetate. The organic phase is dried over sodium sulphate and evaporated at 40°C./12 mmHg. N-(t-Butoxycarbonyl)-0,0'-bis(2-butenyl)-L-dopa 2-butenyl ester is obtained as an oil.

Example 19

By the procedure of Example 18 there is manufactured: N-(t-butoxycarbonyl)-0,0'-diallyl-L-dopa allyl ester of melting point 68°C.; $[\alpha]_D^{25} = -5.1$ ($c = 1$ percent in acetone) utilizing allyl bromide.

Example 20

37.6 g (0.0893 mol) of N-carbobenzoxy-L-dopa benzyl ester in 120 ml. of absolute pyridine are treated dropwise at 0°C. to 5°C. within 1 hour with 27.0 g. (0.235 mol) of methanesulphonic acid chloride and stirred at 0°C. for 2 hours, then treated dropwise within 15 minutes at 0°C. with 37 ml. (0.205 mol) of water and stirred at 0°C. for a further 30 minutes. The mixture is introduced into 1,200 ml. of ice-water and 120 ml. of concentrated aqueous hydrochloric acid and extracted 3 times with 300 ml. of ethyl acetate each time. The organic phase is washed with 200 ml. of a 10 percent by weight aqueous potassium hydrogen carbonate solution and then 200 ml. of aqueous sodium chloride solution, dried over magnesium sulphate and evaporated at 40°C./12 mmHg. After recrystallization from ethyl acetate/petroleum ether, there is obtained N-carbobenzoxy-0,0'-dimesyl-L-dopa benzyl ester of melting point 101°C.

Example 21

13.5 g of N-(t-butoxycarbonyl)-0,0'-diallyl-L-dopa methyl ester are stirred at room temperature for 14 hours in a mixture of 100 ml of dioxan, 41 ml of 1-N aqueous sodium hydroxide and 50 ml of water. The solution is then diluted with 200 ml of water and extracted once with 200 ml of diethyl ether. The aqueous phase is acidified with ice-cold 1-N aqueous sulphuric acid and extracted twice with 200 ml of ethyl acetate each time. The organic extracts are washed 5 times with 100 ml of water each time, combined, dried over sodium sulphate and evaporated at 40°C./12 mmHg. The N-(t-butoxycarbonyl)-0,0'-diallyl-L-dopa which is obtained is recrystallized from ethyl acetate/petroleum ether. Melting point 82°C.; $[\alpha]_D^{25} = +18.2°$ ($c = 1$ percent in methanol).

Example 22

By the procedure of Example 21 there is manufactured: N-(t-butoxycarbonyl)-0,0'-bis(2-propynyl)-L-dopa utilizing N-(t-butoxycarbonyl)-0,0'-bis(2-propynyl)-L-dopa methyl ester.

Example 23

15 g of N-(t-butoxycarbonyl)-0,0'-bis(2-butenyl)-L-dopa 2-butenyl ester are stirred overnight at room temperature in a mixture of 150 ml of dioxan, 50 ml of aqueous 2-N sodium hydroxide and 50 ml of water. The solution is then diluted with 200 ml of water and extracted with 200 ml of diethyl ether. The aqueous phase is brought to pH 1 with ice-cold aqueous 1-N sulphuric acid and extracted three times with 300 ml of ethyl acetate each time. The organic extracts are washed 5 times with 200 ml of water each time, combined, dried over sodium sulphate and concentrated at 40°C./12 mmHg. N-(t-butoxycarbonyl)-0,0'-bis(2-butenyl)-L-dopa of melting point 68°C. (ether/petroluem ether) is obtained.

Example 24

8.7 g of N-carbobenzoxy-0,0'-diacetyl-L-dopa are hydrogenated in 130 ml of glacial acetic acid over 1 g of palladiumcharcoal (5 percent). After completion of the hydrogen uptake, the catalyst is filtered off and rinsed with 50 ml of glacial acetic acid. The filtrate, combined with the wash liquid, is treated with 25 ml of 2-N aqueous hydrochloric acid, and after the addition of 100 ml of absolute toluene, evaporated at 40°C./12 mmHg. The residiue is recrystallized from glacial acetic acid. 0,0'-diacetyl-L-dopa hydrochloride is obtained as colourless crystals of melting point 188°C. (decomposition); $[\alpha]_D^{25} = -16.5°$ ($c = 1$ percent in water).

Example 25

By the procedure of Example 24, N-carbobenzoxy-0,0'-bis (ethoxycarbonyl)-L-dopa is converted to 0,0'-bis(ethoxycarbonyl)-L-dopa (colourless crystals of melting point 178°C. decomposition) after recrystallization from glacial acetic acid/ethyl acetate); $[\alpha]_D^{25} = -8.8°$ ($c = 1$ percent glacial acetic acid) and N-carbobenzoxy-0,0'-dibenzoyl-L-dopa is converted to 0,0'-dibenzoyl-L-dopa (colourless crystals of melting point 202° (decomposition) after recrystallization from butyl acetate/petroleum ether); $[\alpha]_D^{25} = -16.1°$ ($c = 1$ percent, glacial acetic acid).

EXAMPLE 26

2.41 g of N-carbobenzoxy-0,0'-dioctanoyl-L-dopa benzyl ester are hydrogenated in 14.2 ml of glacial acetic acid over 0.142 g of palladium-charcoal (5 percent). After completion of the hydrogen uptake, the catalyst is filtered off and the filtrate evaporated at 40°C./12 mmHg with the addition of 30 ml of toluene. After recrystallization from isopropanol/water, the residue yields 0,0'-dioctanoyl-L-dopa of melting point 200°–203°C.; $[\alpha]_D^{25} = -0.8$ ($c = 0.5$ percent, isopropanol/1-N hydrochloric acid).

Example 27

By the procedure of Example 26 utilizing the corresponding N-carbobenzoxy benzyl ester there is obtained: 0,0'-diheptanoyl-L-dopa (colourless crystals of melting point 208°–209°C. from isopropanol/water; $[\alpha]_{364}^{25} = +12.0°$ ($c = 1$ percent, 1-N hydrochloric acid/isopropanol 1:1); 0,0'-dihexanoyl-L-dopa of melting point 204°–204°C. (from isopropanol/water); $[\alpha]_D^{25} = +13.15°$ ($c = 2$ percent, 1-N hydrochloric acid/dimethyl sulphoxide 1:1) and 0,0'-divaleryl-L-dopa of melting point 201°–202°C. (from isopropanol/water).

Example 28

15.2 g of N-carbobenzoxy-0,0'-dioctanoyl-L-dopa methyl ester are dissolved in 200 ml of glacial acetic acid. After the addition of 3.84 g of benzyl chloride, the mixture is hydrogenated over 2 g of palladium-charcoal (10 percent). After completion of the hydrogen uptake, the catalyst is filtered off and the filtrate concentrated with the addition of 50 ml of toluene. After recrystallization from methyl ethyl ketone, the residue yields 0,0'-dioctanoyl-L-dopa methyl ester hydrochloride as colourless crystals of melting point 136°–137°C.; $[\alpha]_D^{25} = +24.2°$ ($c = 1$ percent, in tetrahydrofuran).

Example 29

By the procedure of Example 28 utilizing the corresponding N-carbobenzoxy-L-dopa methyl ester there is obtained:

0,0'-diheptanoyl-L-dopa methyl ester hydrochloride of melting point 159°–160°C. (decomposition); $[\alpha]_D^{25} = +21.0°$ ($c = 1$ percent, in isopropanol);

0,0'-dihexanoyl-L-dopa methyl ester hydrochloride of melting point 163°–164°C. (decomposition); $[\alpha]_D^{25} = +23.0°$ ($c = 1$ percent, in isopropanol);

0,0'-divaleryl-L-dopa methyl ester hydrochloride of melting point 150°–151°C. (decomposition); $[\alpha]_D^{25} = +24.9°$ ($c = 1$ percent, in isopropanol);

0,0'-dibutyryl-L-dopa methyl ester hydrochloride of melting point 119°–127°C. (decomposition); $[\alpha]_D^{25} = +26.3°$ ($c = 1$ percent, in isopropanol);

0,0'-dipropionyl-L-dopa methyl ester hydrochloride of melting point 110°–132°C. (decomposition); $[\alpha]_D^{25} = +28.7°$ ($c = 1$ percent, in isopropanol);

0,0'-diacetyl-L-dopa methyl ester hydrochloride of melting point 118°C. (decomposition); $[\alpha]_D^{25} = -16.5°$ ($c = 1$ percent, in water);

0,0'-dibenzoyl-L-dopa methyl ester oxalate of melting point 147°–148°C. (from tetrahydrofuran/ethyl acetate); $[\alpha]_D^{25} = +21.9°$ ($c = 1$ percent, in dimethyl sulphoxide) and 0,0'-bis(ethoxycarbonyl)-L-dopa methyl ester oxalate of melting point 87°–88°C. (from tetrahydrofuran/ether); $[\alpha]_D^{25} = +15.6°$ ($c = 1$ percent, in dimethyl sulphoxide).

Example 30

26.3 g (0.0456 mol) of N-carbobenzoxy-0,0'-dimesyl-L-dopa benzyl ester are hydrogenated in 500 ml of glacial acetic acid over 10 g of palladium-charcoal (5 percent). After completion of the hydrogen uptake the catalyst is separated off and the filtrate evaporated at 50°C./12 mmHg. After recrystallization from glacial acetic acid/isopropanol, there is obtained 0,0'-dimesyl-L-dopa of melting point 239° C. (decomposition); $[\alpha]_D^{25} = -1.7°$ ($c = 1$ percent, in glacial acetic acid).

Example 31

The 0,0'-diacetyl-N-(t-butoxycarbonyl)-L-dopa is dissolved in 100 ml of glacial acetic acid. A strong stream of dry hydrogen chloride gas is conducted into this solution for about 15 minutes. After 12 hours at room temperature, the precipitated 0,0'-diacetyl-L-dopa hydrochloride is filtered off and recrystallized from glacial acetic acid. The product is identical with the compound described in Example 22.

Example 32

The N-(t-butoxycarbonyl)-0,0'-bis(dimethylcarbamoyl)-L-dopa methyl ester is dissolved in 1,000 ml of diethyl ether. A vigorous stream of dry hydrogen chloride gas is conducted with ice-cooling into the solution obtained for 3 hours, there separating out an oily precipitate. The mixture is then evaporated at 40°C/12 mmHg with the addition of toluene. The residue is partitioned between 500 ml of ethyl acetate and 500 ml of saturated aqueous sodium bicarbonate solution. The aqueous phase is saturated with sodium chloride, brought to pH 9 with sodium carbonate, separated off and extracted a further 5 times with 500 ml of ethyl acetate each time. The combined organic extracts are dried over sodium sulphate and evaporated at 40°C./12 mmHg with the addition of toluene. The oily residue is taken up in 360 ml of isopropanol, treated with a solution of 11.05 g of oxalic acid in 180 ml of isopropanol and cooled. The precipitated crystals are recrystallized from isopropanol. 0,0'-Bis(dimethylcarbamoyl)-L-dopa methyl ester oxalate is obtained; melting point 128°–130°C.; $[\alpha]_D^{25} = -6.3°$ ($c = 1$ percent, in water).

Example 33

10.4 g of N-(t-butoxycarbonyl)-0,0'-diallyl-L-dopa are dissolved in 15 ml of 2.4-N hydrogen chloride in glacial acetic acid and 30 ml. of glacial acetic acid.

After completion of the gas-evolution, 100 ml of petroleum ether are added. The precipitated crystals are filtered off and recrystallized from isopropanol/petroleum ether. 0,0'-Diallyl-L-dopa hydrochloride is obtained as colourless crystals of meting point 165°C.; $[\alpha]_D^{25} = +22.2°$ ($c = 1$ percent, in glacial acetic acid).

Example 34

By the procedure of Example 28 utilizing N-(t-butoxycarbonyl)-0,0'-bis(2-propynyl)-L-dopa there is prepared 0,0'-bis(2-propynyl)-L-dopa hydrochloride of melting point 157°C. (decomposition); $[\alpha]_D^{25} = +6.8°$ ($c = 1$ percent, glacial acetic acid).

Example 35

The N-(t-butoxycarbonyl)-0,0'-bis(2-butenyl)-L-dopa 2-butenyl ester dissolved in 20 ml of dioxan. 9 ml of 11 percent hydrogen chloride in dioxan are added to the solution. The solution is then stirred until completion of the gas-evolution and concentrated at 40°C./12 mmHg. The residual 0,0'-bis(2-butenyl-L-dopa 2-butenyl ester hydrochloride is recrystallized from propanol/petroleum ether. Melting point 88°C.; $[\alpha]_D^{25} = -3.6°$ ($c = 1$ percent, in methanol).

Example 36

By the procedure of Example 35 there is manufactured from N-(t-butoxycarbonyl)-0,0'-di(allyl)-L-dopa allyl ester, the compound 0,0'-diallyl-L-dopa allyl ester hydrochloride of melting point 124°C.; $[\alpha]_D^{25} = +2.6°$ ($c = 1$ percent, in glacial acetic acid).

EXAMPLE 37

4 g of N-(t-butoxycarbonyl)-0,0'-bis(2-butenyl)-L-dopa are dissolved in 10 ml of dioxan. 4.5 ml of an 11 percent by weight solution of hydrogen chloride in dioxan are then added. The solution is stirred at room temperature until completion of the gas-evolution and then evaporated at 40°C./12 mmHg. The residual 0,0'-bis(2-butenyl)-L-dopa hydrochloride is recrystallized from isopropanol/petroleum ether. Melting point 59°C. (decomposition); $[\alpha]_D^{25} = +16°$ ($c = 1$ percent, in methanol).

EXAMPLE 38

20 g of N-acetyl-0,0'-bis(ethoxycarbonylmethyl)-L-dopa ethyl ester are heated under reflux condition for 2 hours in 400 ml of 3-N aqueous hydrochloric acid. The solution is evaporated at 50°C./12 mmHg, and the residue recrystallized from 3-N aqueous hydrochloric acid. There is obtained 0,0'-bis(carboxymethyl)-L-dopa hydrochloride of melting point 213°C. (decomposition); $[\alpha]_D^{25} = -4.2°$ ($c = 1$ percent, 1-N hydrochloric acid).

EXAMPLE 39

A mixture of 3.3 g of 0,0'-diacetyl-L-dopa hydrochloride, 3 ml of concentrated aqueous sulphuric acid, 100 ml. of monoglyme and 120 ml of isobutylene is stirred for 3 hours at room temperature in an autoclave. The mixture is then poured onto 500 g of ice, neutralized with saturated aqueous sodium bicarbonate solution and extracted three times with with 200 ml of ethyl acetate. The combined organic extracts are dried over sodium sulphate and strongly concentrated at 40°C./12 mmHg. The residue is dissolved in 30 ml of tetrahydrofuran and treated with a solution of 0.75 g of oxalic acid in 30 ml of tetrahydrofuran. The precipitated crystals are recrystallized from ethyleneglycol dimethyl ether. There is obtained 0,0'-diacetyl-L-dopa t-butyl ester oxalate of melting point 154°C. (decomposition); $[\alpha]_D^{25} = +4.8°$ ($c = 1$ percent, in water).

EXAMPLE 40

34 g of N-[(o-nitrophenyl)-thio]-L-dopa methyl ester are dissolved in 50 ml of absolute pyridine and treated with 20 ml of acetic acid anhydride. The mixture is stirred at room temperature for 12 hours, then evaporated at 40°C./12 mmHg. The residue thus obtained is taken up in ethyl acetate and filtered through 150 g of Kieselgel. The 3,4-diacetyl-N-[(o-nitrophenyl)-thio]-L-dopa methyl ester which is isolated from the eluate melts at 102°–105°C. after recrystallization from diisopropyl ether; $[\alpha]_D^{25} = +41.1°$ ($c = 1$ percent, in methanol).

EXAMPLE 41

A mixture of 19.7 g of L-dopa, 40 g of borax, 50 ml of 2-N aqueous sodium hydroxide, 600 ml of water and 200 ml of dioxan is stirred in an argon atmosphere until, after about 15 minutes, all the solid has gone into solution. The solution is simultaneously treated dropwise at 20°C. with 21 g of o-nitrophenylsulphenyl chloride in 50 ml of dioxan and 2-N aqueous sodium hydroxide in such a manner that the pH value lies between 9.5 and 10. After completion of the introduction, the mixture is stirred at 20°C. for a further 2 hours. The solution obtained, which contains the boric acid complex of N-[(o-nitrophenyl)-thio]-L-dopa, is used in the process without isolating the product.

The aqueous alkaline solution obtained hereinbefore which contains the boric acid complex of N-[(o-nitrophenyl)-thio]-L-dopa is acidified to pH 1 by addition of 6-N aqueous sulphuric acid in an argon atmosphere with ice-cooling and extracted twice with 300 ml of ethyl acetate each time. The extract is washed with water, dried over sodium sulphate and evaporated at 30°C./11 mmHg with the addition of 20 g of dicyclohexylamine. The residual dicyclohexylamine salt of N-[(o-nitrophenyl)-thio]-L-dopa crystallizes on digestion with ether and, after recrystallization from methanol/diethyl ether, melts at 126°C. (decomposition); $[\alpha]_D^{25} = +36°$ ($c = 0.1$ percent, in methanol).

53.1 g of the dicyclohexylamine salt of N-[(o-nitrophenyl)-thio]-L-dopa are shaken for 1 hour together with 1,000 ml of ether and 300 ml of 2-N aqueous hydrochloric acid. The ether phase, which contains N-[(o-nitrophenyl)-thio]-L-dopa, is dried over sodium sulphate and filtered. The filtrate is treated dropwise with ice-cooling with the calculated amount of a solution of diazomethane in diethyl ether. After completion of the addition, the ether solution is washed with saturated sodium bicarbonate solution, dried over sodium sulphate and evaporated under reduced pressure. The residual N-[(o-nitrophenyl)-thio]-L-dopa methyl ester is a brown-coloured oil.

EXAMPLE 42

94.2 g of N-(t-butoxycarbonyl)-L-dopa are stirred into a mixture of 310 ml of dioxan and 950 ml of water. The solution which is obtained is adjusted to a pH value of 7.5 with 2-N sodium hydroxide. 76.7 ml of acrylyl chloride and 2-N sodium hydroxide are then added dropwise within 1 hour, with ice-cooling, in such a manner that the pH value of the solution remains between 6 and 8. The mixture is stirred for a further 1 hour. It is then washed once with 200 ml of diethyl ether and carefully acidified to pH 2.5 with 6-N aqueous sulphuric acid. After saturation with sodium chloride, it is extracted 3 times with 2 liters of ethyl acetate each time. The organic phase is washed 7 times with saturated aqueous sodium chloride solution, dried over sodium sulphate/animal charcoal and the filtrate evaporated under reduced pressure. The oily residue is chromatographed on 7 kg of Kieselgel with chloroform/isopropanol. 0,0′-Diacrylyl-N-(t-butoxycarbonyl)-L-dopa is thus obtained as an oil. The structure is in agreement with the NMR and mass spectra.

EXAMPLE 43

Tablets of the following composition are prepared:

| | |
|---|---|
| 0,0′bis(ethoxycarbonyl)-L-dopa | 100 mg. |
| lactose | 61 mg. |
| corn starch | 30 mg. |
| polyvinylpyrrolidone | 4 mg. |
| talcum | 5 mg. |

The active ingredient is mixed with the lactose and the corn starch and, after the addition of a solution of polyvinylpyrrolidone in 40 ml of ethanol, granulated. The granulate is dried at 30°C., mixed with talcum and compressed to tablets.

| | |
|---|---|
| Individual weight of one tablet | 200 mg. |
| Active ingredient content of one tablet | 100 mg. |

EXAMPLE 44

Gelatin capsules containing the following ingredients are prepared:

| | | |
|---|---|---|
| 0,0′-bis(carboxymethyl)-L-dopa | 50 | mg. |
| mannitol | 98.5 | mg. |
| stearic acid | 1.5 | mg. |

The ingredients are homogeneously mixed and filled into interlocking gelatin capsules No. 2 via a capsule-filling machine.

| | |
|---|---|
| Individual weight of one capsule | 150 mg. |
| Active ingredient content of one capsule | 50 mg. |

We claim:
1. A compound of the formula:

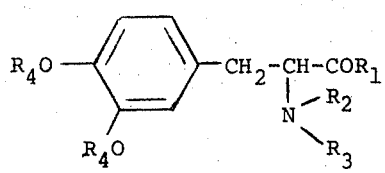

wherein $R_1$ is selected from the group consisting of $C_{1-7}$ alkoxy, $C_{3-8}$ alkenylalkoxy or phenyl $C_{1-7}$ alkoxy; $R_2$ is hydrogen; $R_3$ is hydrogen or a substituent containing from 1 to 18 carbon atoms selected from the group consisting of

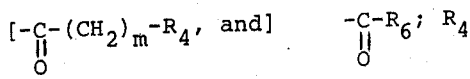

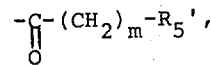

is a substituent containing from 1 to 18 carbon atoms selected from the group consisting of

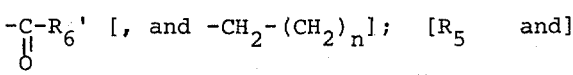

and $-\overset{\text{O}}{\underset{\|}{C}}-R_6'$ [, and $-CH_2-(CH_2)_n$]; [$R_5$ and]

$R_5'$ is $C_{1-7}$ alkoxy; $R_6$ is $C_{1-7}$ alkoxy; and $m$ is an integer from 0 to 15 with the proviso that $R_3$ and $R_4$ are different substituents;
and pharmaceutically acceptable salts thereof.

2. The compound of claim 1 wherein said compound has the formula

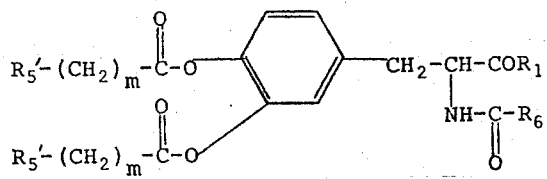

wherein $m$, $R_1$, $R_5'$ and $R_6$ are as above.

3. The compound of claim 2 wherein said $R_6$ is phenylalkoxy.

4. The compound of claim 3 wherein said compound is N-carbobenzoxy-0,0′-diheptanoyl-L-dopa benzyl ester.

5. The compound of claim 3 wherein said compound is N-carbobenzoxy-0,0′-dihexanoyl-L-dopa benzyl ester.

6. The compound of claim 3 wherein said compound is N-carbobenzoxy-0,0′-dibutyryl-L-dopa methyl ester.

7. The compound of claim 2 wherein $R_6$ is alkoxy.

8. The compound of claim 1 wherein said compound has the formula

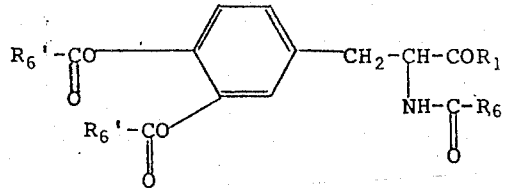

wherein $R_6$, $R_6'$ and $R_1$ are as above.

9. The compound of claim 8 wherein $R_6$ is phenylalkoxy.

10. The compound of claim 8 wherein $R_6'$ is alkoxy.

11. The compound of claim 10 wherein said compound is N-carbobenzoxy-0,0′-bis(ethoxycarbonyl)-L-dopa methyl ester.

12. A compound in accordance with claim 1 having the formula

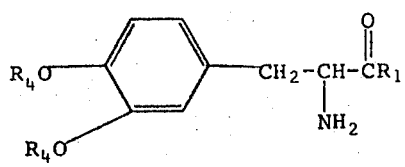

wherein $R_1$ and $R_4$ are as above and pharmaceutically acceptable salts thereof.

13. The compound of claim 12 wherein $R_4$ is

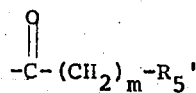
and $R_5'$ is as above.
14. The compound of claim 12 wherein said compound is 0,0'-dipropionyl-L-dopa methyl ester.
15. The compound of claim 12 wherein said compound is 0,0'-dibutyryl-L-dopa methyl ester.
16. The compound of claim 12 wherein $R_4$ is
and $R_6'$ is as above.
17. The compound of claim 16 wherein said compound is 0,0'-bis(ethoxycarbonyl)-L-dopa methyl ester.
* * * * *

UNITED STATES PATENT AND TRADEMARK OFFICE
CERTIFICATE OF CORRECTION

PATENT NO. : 3,859,331

DATED : January 7, 1975

INVENTOR(S) : Ado Kaiser, Wolfgang Koch, Marcel Scheer and Uwe Wolcke

It is certified that error appears in the above-identified patent and that said Letters Patent are hereby corrected as shown below:

Cover page, after "[21] Appl. No. 190,269" insert:

[30] Foreign Application Priority Data

October 30, 1970   Switzerland   No. 16,048/70

*Signed and Sealed this*

*twenty-ninth* Day of *June 1976*

[SEAL]

*Attest:*

RUTH C. MASON
*Attesting Officer*

C. MARSHALL DANN
*Commissioner of Patents and Trademarks*